United States Patent
Ito

(10) Patent No.: US 8,836,979 B2
(45) Date of Patent: Sep. 16, 2014

(54) PRINTING MANAGEMENT PROGRAM, PRINTING MANAGEMENT APPARATUS, PRINTING MANAGEMENT METHOD, AND PRINTING SYSTEM

(75) Inventor: Yoshikazu Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 13/369,726

(22) Filed: Feb. 9, 2012

(65) Prior Publication Data

US 2012/0224218 A1 Sep. 6, 2012

(30) Foreign Application Priority Data

Mar. 2, 2011 (JP) ................... 2011-045639

(51) Int. Cl.
 *G06F 15/02* (2006.01)
 *G06F 3/12* (2006.01)
(52) U.S. Cl.
 CPC ............ *G06F 3/1208* (2013.01); *G06F 3/1288* (2013.01); *G06F 3/1255* (2013.01)
 USPC ....... 358/1.15; 358/1.13; 358/1.17; 358/1.18; 358/1.9
(58) Field of Classification Search
 USPC ............... 358/1.15, 1.9, 1.13, 1.17, 1.18, 1.2; 345/100; 715/777
 See application file for complete search history.

(56) References Cited

U.S. PATENT DOCUMENTS

| | | | | |
|---|---|---|---|---|
| 5,301,265 | A * | 4/1994 | Itoh | 345/428 |
| 5,495,561 | A * | 2/1996 | Holt | 358/1.15 |
| 2002/0054008 | A1* | 5/2002 | Aikawa | 345/100 |
| 2008/0079997 | A1* | 4/2008 | Kawano | 358/1.15 |
| 2008/0114757 | A1* | 5/2008 | Dejean et al. | 707/6 |
| 2009/0279126 | A1 | 11/2009 | Williams | |
| 2009/0279137 | A1* | 11/2009 | Mori | 358/1.15 |
| 2010/0033744 | A1* | 2/2010 | Maeda | 358/1.9 |

FOREIGN PATENT DOCUMENTS

| | | |
|---|---|---|
| JP | 2006-123414 A | 5/2006 |
| JP | 2009-271929 A | 11/2009 |

* cited by examiner

*Primary Examiner* — Allen H Nguyen
(74) *Attorney, Agent, or Firm* — Harness, Dickey & Pierce, P.L.C.

(57) ABSTRACT

A printing management program is disclosed. The program causes a computer to function as a printing job accepting unit which accepts a printing job from a pre-process within a printing process; a printing setting change accepting unit which accepts, from a user, a change of a printing setting which is set for the accepted printing job; a specifying unit which specifies a pagination setting for the printing job that is set in the pre-process; and a warning unit which provides a warning on a change of the printing setting depending on the specified pagination setting.

10 Claims, 12 Drawing Sheets

PRINTING MANAGEMENT PROGRAM, PRINTING MANAGEMENT APPARATUS, PRINTING MANAGEMENT METHOD, AND PRINTING SYSTEM

TECHNICAL FIELD

The present invention relates to printing management programs, printing management apparatuses, printing management methods, and printing systems that manage a printing job.

BACKGROUND ART

In a commercial printing industry in which printed matter (a catalog, an advertisement, etc.) is received from a customer, a printed output which the customer desires is generated from the printed matter, and the printed output is delivered to the customer to gain remuneration, multiple steps from receiving of the printed matter to delivering are followed to conduct operations. The steps from the receiving of the printed matter to the delivering include submitting of a manuscript for the printed matter from the customer; accepting of printing conditions of the printed output; color correcting, layout correcting, stitch position correcting as pre-press operations; proof printing to confirm pre-press results of the customer; printing operations; printing stitching after printing; a post-process treatment such as compression bonding; and delivering of the printed output to the customer. Increase/decrease occurs for the steps from receiving of the printed matter to delivering depending on the printing conditions of the printed output which the customer desires.

In the commercial printing industry, volume printing of printed outputs is handled using the above-described steps due to a large number of orders received from the customers to provide a high-volume printing of the printed matter. Moreover, with respect to the printed matter for the high-volume printing, printing conditions for the printed output from the customer are often fixed. Thus, in the commercial printing industry, a printed output which the customer desires is generated in a printing cycle in which the high-volume printing is performed with one determined printing condition and printing of a lot is completed, after which the printing condition is changed and the high-volume printing is performed again.

In this printing cycle, the above-described multiple steps often occur when the printing condition is changed. Therefore, when there is no change to the printing condition, a commercial printing vendor can perform consecutive printing within the same step, making it possible to perform an efficient high-volume printing operation.

Recently, in the commercial printing industry, a POD (Print on Demand) market is emerging in which relatively small-lot printed matter called the POD is delivered to a customer in a short lead time. In the POD market, orders are often received from multiple customers. As a result, in the POD market, printing conditions of printed outputs and printed matter for which a manuscript is submitted to the commercial printing vendor are often diverse.

At the same time, in recent years, digitization of the printed matter has been in progress, so that control is conducted for generating the printed matter using a computer. For example, a technique called a workflow is emerging in which a manuscript for printed matter is submitted over a network as electronic data, and the above-described multiple steps are controlled. For example, the above-described workflow also includes a workflow in which a printing operation with the above-described multiple steps is defined with a job ticket called a JDF (Job Definition Format) and the printing operation is controlled with a printing system.

With such changes in the printing environment, the commercial printing vendors have promoted computerization of the printing system for generating the printed matter for which an order is received. On the other hand, it is becoming necessary for the commercial printing vendor to build a printing system which can handle diverse printing conditions of the printed output from the customer. Moreover, in order to generate diverse printed outputs as a desire of the customer, it is also becoming necessary to respond in system aspects such as introducing multiple printer apparatuses and device (peripheral) apparatuses and to respond in operational step aspects such as changing of multiple steps in a relatively short cycle.

It is becoming necessary for the commercial printing vendor to respond in the above-described manner, but it is also becoming necessary to make a further operational efficiency improvement for generating profits. Simplifying operations is one measure which leads to improving the operational efficiency.

In a production printing (PP) business, pagination and printing setting processes in multiple applications and DFE (Digital front end) are performed as pre-processing (a pre-press step). Of the printing setting processes, a finisher process involves many setting items compared to a multi-functional printer (MFP), such as various cutting and folding types besides stapling and punching.

There is a related art scheme which designates in advance, with a job ticket, etc., a post-processing (finishing) apparatus which performs a finisher process. Moreover, a related art scheme is also known in which even a printing job designated in advance by the post-processing apparatus is suitably carried out using the post-processing apparatus selected arbitrarily based on a judgment of an operator himself to suitably carry out an operation using a usable post-processing unit (see FIG. 1, for example.)

PATENT DOCUMENTS

Patent Document 1 JP2006-123414A

In the PP business, it is necessary to allow canceling (removing) of a stapling process from the printing setting even when a pagination process for a weekly magazine is performed in the pre-processing, for example, taking into account the finisher process performed in a post-processing apparatus off-line. However, it may not be determined whether a change of the printing setting to the finisher process that is in conflict with the pagination process such as the punching process or the stapling process for a one point on the left or two points on the right is performed erroneously or performed intentionally by an operator. In the PP business, there is a problem that it does not make sense to simply prohibit a change in a printing setting since the finisher process which is in conflict with the pagination process may be performed intentionally.

DISCLOSURE OF THE INVENTION

In light of the problems as described above, an object of the present invention is to provide a printing management program, a printing management apparatus, a printing management method, and a printing system which make it possible to provide a warning against a change in a printing setting for post-processing that is likely to have been performed erroneously.

According to an embodiment of the present invention, printing management program is provided which causes a computer to function as a printing job accepting unit which accepts a printing job from a pre-process within a printing process; a printing setting change accepting unit which accepts, from a user, a change of a printing setting which is set for the accepted printing job; a specifying unit which specifies a pagination setting for the printing job that is set in the pre-process; and a warning unit which provides a warning on a change of the printing setting depending on the specified pagination setting.

The present invention may also take a form such that elements, representations, or arbitrary combinations of the elements of the present invention are applied to a method, an apparatus, a system, a computer program, a recording medium, a data structure, etc.

The present invention makes it possible to provide a printing management program, a printing management apparatus, a printing management method, and a printing system that make it possible to provide a warning against a change in a printing setting for post-processing that is likely to have been performed erroneously.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Throughout the drawings for explaining the embodiments, same letters are used for those elements having the same functions, so that repetitive explanations are omitted.

Figure 1:
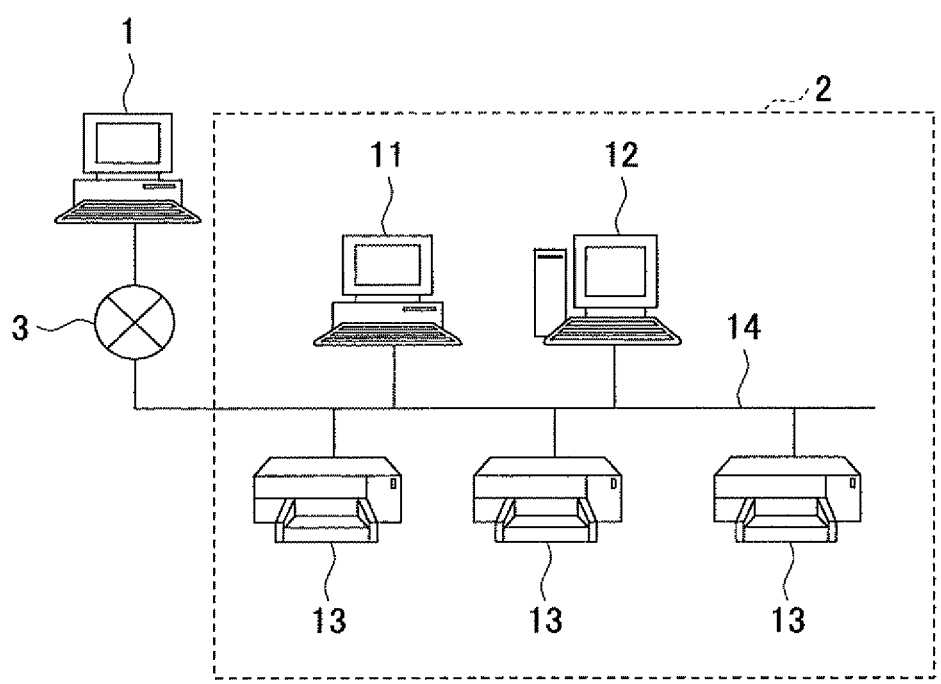
FIG. 1 is a system configuration diagram of an example which includes a printing system to which the present invention is applied.

FIG. 1 is a system configuration diagram of an example which includes a printing system to which the present invention is applied. In the system configuration in FIG. 1, a user client 1 and a printing system 2 are connected via a network 3 such as the Internet. The user client 1 is a computer used for a customer to entrust a commercial printing vendor with printing operations. The printing system 2 is a system which is used by an operator of the commercial printing vendor, etc.

Moreover, the printing system 2 includes a management client 11, a print server 12, one or more printer apparatuses 13, and a network 14 such as a LAN. The management client 11, the print server 12, and the printer apparatuses 13 are connected via the network 14. A post-processing apparatus is not shown.

The customer operates an application in the user client to transmit a printing job which includes printing data (contents) and a job ticket for a document to be printed to the print server 12. The management client 11 is a computer used by an operator such as the commercial printing vendor to manage the entrusted printing operations.

The operator uses a WWW browser from the management client 11 to access a Web user interface of the print server 12 and perform management of the printing system 2, printing starting, printing stopping, deleting, searching for a printing job for printing, etc. The print server 12 is an example of the printing management apparatus. The print server 12 causes the printer apparatus 13 to print the printing job for which the printing operation is entrusted from the user client 1. Moreover, the print server 12 graphically displays an operating condition of each printer apparatus 13, etc., onto a screen in real time. According to a control of the print server 12, the printer apparatus 13 generates a printing image from the printing job, and prints it on a predetermined sheet of paper.

Figure 2:
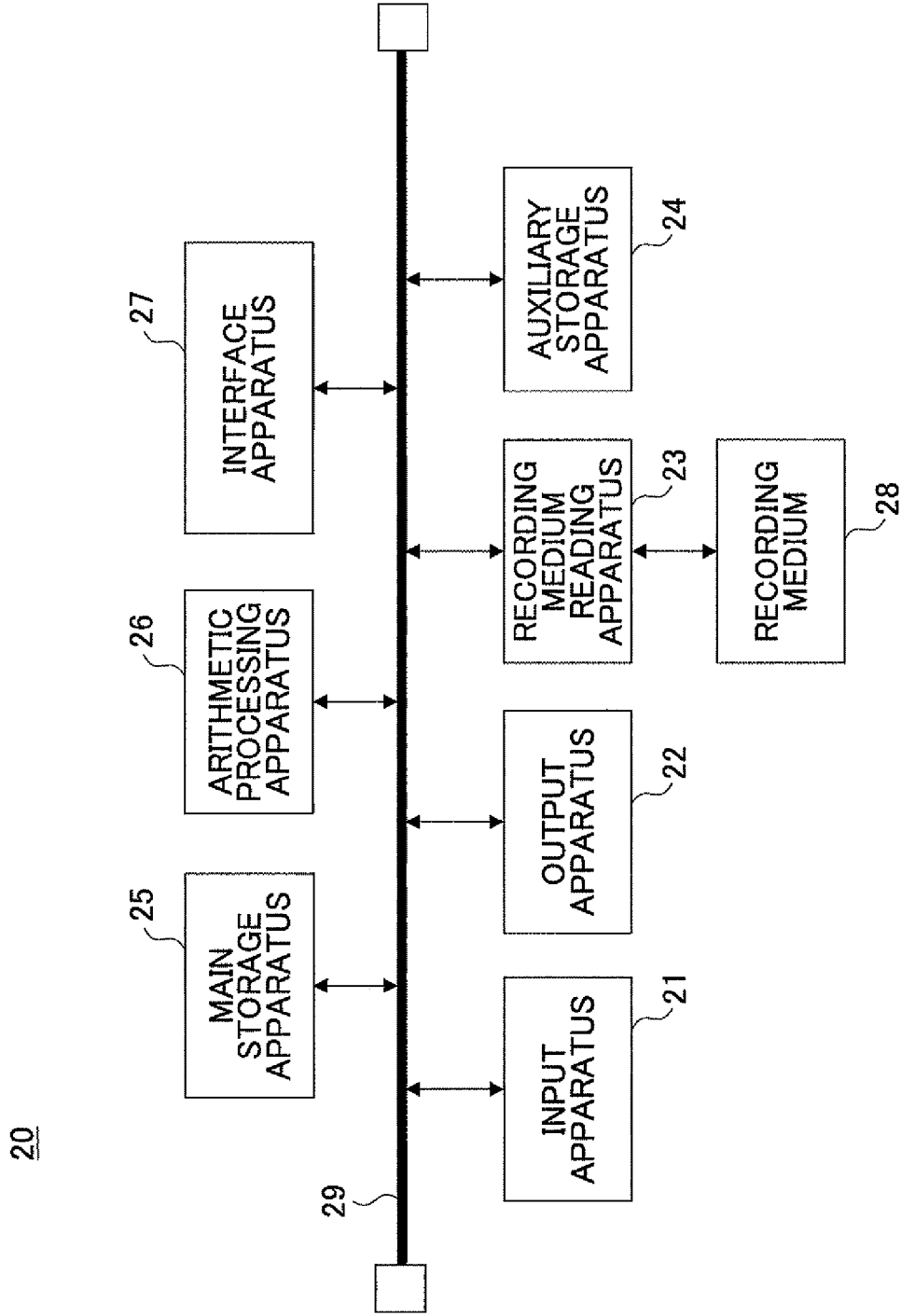
FIG. 2 is a hardware configuration diagram of an exemplary PC.

The print server 12 is realized with a PC with a hardware configuration as shown in FIG. 2, for example. FIG. 2 is a hardware configuration diagram of an exemplary PC. The PC 20 includes an input apparatus 21, an output apparatus 22, a recording medium reading apparatus 23, an auxiliary storage apparatus 24, a main storage apparatus 25, an arithmetic processing apparatus 26, and an interface apparatus 27.

The input apparatus 21 includes a keyboard, a mouse, etc. The input apparatus 21 is used for inputting various signals. The output apparatus 22 includes a display apparatus, etc. The output apparatus 22 is used for displaying various windows and data, etc. The interface apparatus 27 includes a modem, a LAN card, etc. The interface apparatus 27 is used for connecting to the network 14.

A printing management program installed in the printer server 12 is a part of various programs which control the PC 20. The printing management program is provided by distributing the recording medium 28, downloading from the network 14, etc.

For the recording medium 28, various types of recording media may be used such as a recording medium which optically, electrically, or magnetically records information such as a CD-ROM, a flexible disk, a magneto-optical disk, etc., and a semiconductor memory which electrically records information such as a ROM or a flash memory.

When the recording medium 28 having the recorded printing management program therein is set in the recording medium reading apparatus 23, the printing management program is copied from the recording medium 28 to the auxiliary storage apparatus 24 by the recording medium reading apparatus 23. The printing management program which is downloaded from the network 14, etc., is stored in the auxiliary storage apparatus 24 via the interface apparatus 27.

The auxiliary storage apparatus 24 stores the installed printing management program, a required file, data, etc. The main storage apparatus 25 receives the printing management program from the auxiliary storage apparatus 24 at the time of launching the printing management program for execution. Then, the arithmetic processing apparatus 26 realizes various processes as described below according to the printing management program stored in the main storage apparatus 25.

Similarly, the user client 1 and the management client are realized by a PC such as one shown in FIG. 2, for example. The arithmetic processing apparatus 26 of the user client 1 implements various processes as described below according to an application stored in the main storage apparatus 25.

Figure 3:
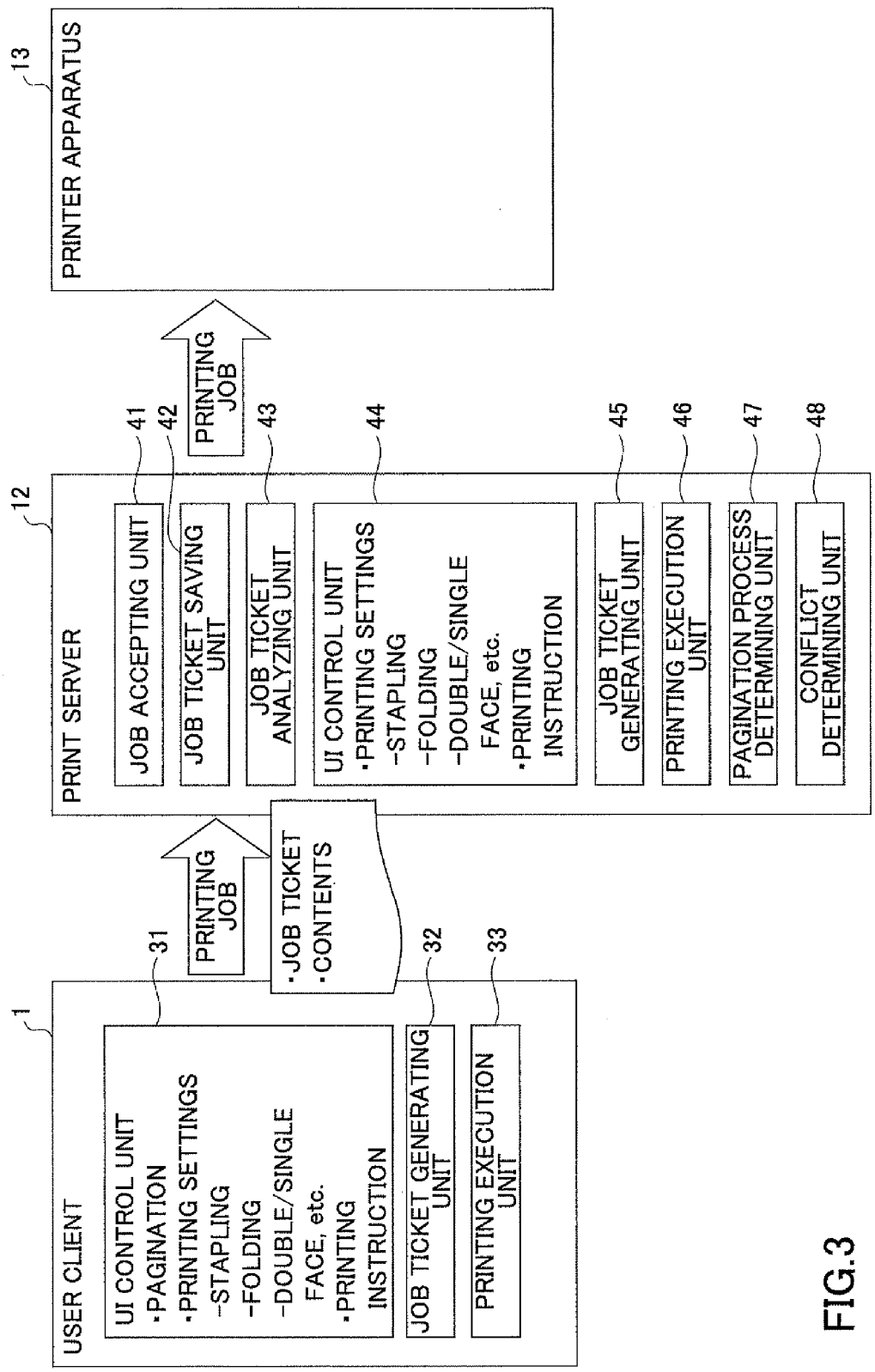
FIG. 3 is a processing block diagram of an example of a user client and a print server.

The user client 1 and the print server 12 are realized with a processing block shown in FIG. 3, for example. In FIG. 3, the management client 11, which is shown in FIG. 1, is not shown. FIG. 3 is a processing block diagram of an example of a user client and a print server.

The user client 1 has installed an application. The user client 1 executes the application to realize a UI control unit 31, a job ticket generating unit 32, and a printing execution unit 33. The print server 12 has installed a printing management program. The print server 12 executes the printing management program to realize a job accepting unit 41, a job ticket saving unit 42, a job ticket analyzing unit 43, a UI control unit 44, a job ticket generating unit 45, a printing execution unit 46, a pagination process determining unit 47, and a conflict determining unit 48.

The UI control unit 31 controls a UI which accepts a pagination process, a printing setting process, and a printing instruction from the operator. The job ticket generating unit 32 generates a job ticket with contents set by the pagination process and the printing setting process in the UI control unit 31. Moreover, the printing execution unit 33 performs a printing process of a printing job for which there is a printing instruction at the UI control unit 31. With the printing process, the printing job is transmitted to the print server 12. The printing setting process may also be arranged to be performed at the print server 12 without performing it at the user client 1.

The job accepting unit 41 of the print server 12 accepts a printing job from the user client 1. The job ticket saving unit 42 saves a job ticket appended to the printing job accepted by the job accepting unit 41. The job ticket analyzing unit 43 analyzes the contents set in the job ticket appended. The UI control unit 44 reflects the contents analyzed by the job ticket analyzing unit 43 to the UI. The UI control unit 44 controls the UI which accepts the printing setting process and the printing instruction from an operator.

The job ticket generation unit 45 reflects contents set again by the printing setting process at the UI control unit 44 to the job ticket. The printing execution unit 46 accepts a printing instruction from the UI control unit 44. The pagination process determining unit 47 determines the pagination setting as described below. The conflict determining unit 48 checks whether there occurs a conflict between a printing setting which is changed by the print server 12 and a pagination setting which is set by the pagination process. If there occurs a conflict, the conflict determining unit 48 causes the UI control unit 44 to display a warning screen as described below. If no conflict occurs, or if the operator instructs a printing execution even if a conflict occurs, the printing execution unit 46 performs a printing process of the printing job for which an instruction for printing has been made by the UI control unit 44. With the printing process, the printing job is transmitted to the printer apparatus 13.

Figure 4:
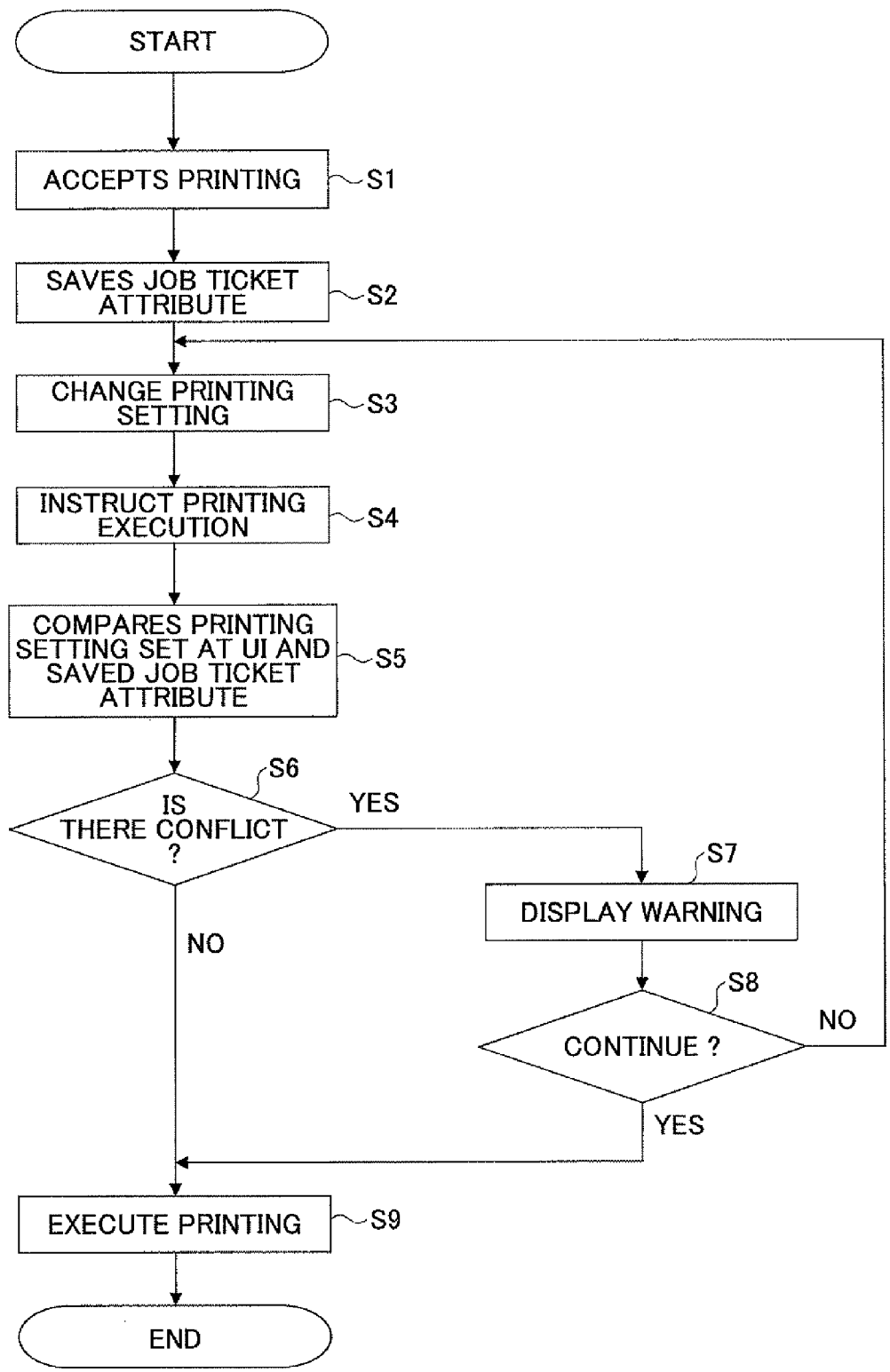
FIG. 4 is a flowchart of an example which shows a processing procedure of the print server.

FIG. 4 is a flowchart of an example which shows a processing procedure of the print server 12. A processing procedure in FIG. 4 shows a procedure from a process in which the print server 12 accepts a printing job from the user client 1 to a process in which a printing process is performed. FIG. 4 shows a processing procedure in which a printing setting which is set by a printing setting process at the user client 1 is changed at the print server 12, after which it is determined whether a conflict occurs between a pagination setting which is set with a pagination process and a printing setting which is changed at the print server 12; and a warning is displayed if there is the conflict.

In step S1, the job accepting unit 41 accepts a printing job from the user client 1. In step S2, the job ticket saving unit 42 saves a job ticket appended to the printing job accepted by the job accepting unit 41 into the auxiliary storage apparatus 24 or the main storage apparatus 25.

In step S3, the job ticket analyzing unit 43 analyzes the contents set in the appended job ticket. The UI control unit 44 reflects the contents analyzed by the job ticket analyzing unit 43 into the UI. The UI control unit 44 accepts a change in a printing setting from an operator. The UI control unit 44 reflects a printing setting which is set again by the operator in the printing setting process into the UI. In step S4, it is assumed that the UI control unit 44 has accepted the printing instruction from the operator.

Moreover, in step S5, the pagination process determining unit 47 determines the pagination setting as described below. The conflict determining unit 48 determines whether there is a conflict between a printing setting changed by the print server 12 and a pagination setting set by the pagination process by the user client 1.

In step S6, if there occurs a conflict, the conflict determining unit 48 causes the UI control unit 44 to display a below-described warning screen in step S7. In step S8, the UI control unit 44 accepts an instruction from the operator that printing is to be continued or an instruction that printing is not to be continued. When the instruction is received from the operator that printing is not to be continued, the job ticket analyzing unit 43 again performs step S3.

When there is no conflict in step S6 or an instruction is received in step S8 from the operator that printing is to be continued, the job ticket generating unit 45 reflects the contents set again by the printing setting process at the UI control unit 44 into the job ticket. After the contents set again by the printing setting process at the UI control unit 44 are reflected, the printing job is transmitted to the printer apparatus 13.

Figure 5:
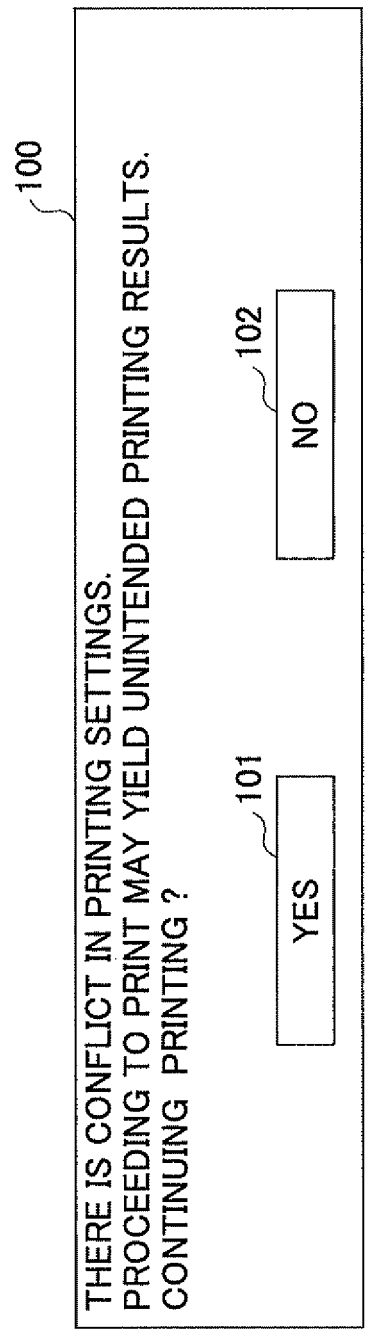
FIG. 5 is an image diagram of an exemplary warning screen.

FIG. 5 is an image diagram of an exemplary warning screen. A warning screen 100 in FIG. 5 is an exemplary display of a warning message which indicates that there is a possibility of a conflict occurring between the pagination setting set by the pagination process at the user client 1 and the printing setting changed at the print server 12. The warning screen 100 is provided with a button 101 which accepts an instruction from an operator to continue printing and a button 102 which accepts an instruction not to continue printing.

Figure 6:
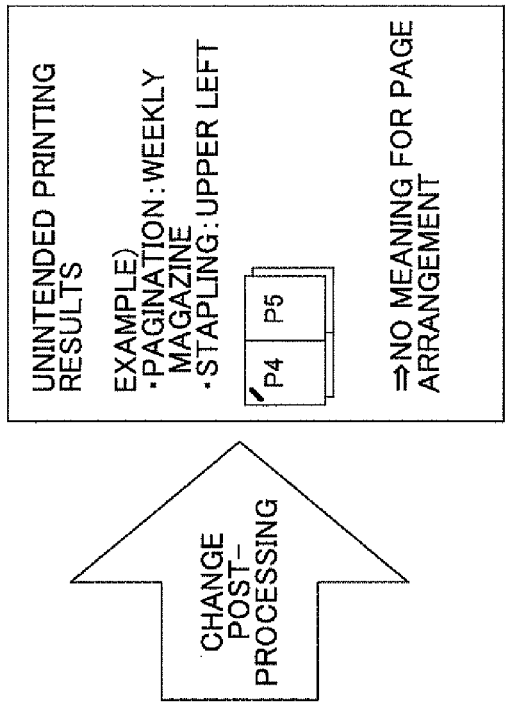
FIG. 6 is an explanatory diagram for explaining a conflict between a pagination setting and a printing setting.

FIG. 6 is an explanatory diagram for explaining a conflict between a pagination setting and a printing setting. FIG. 6 shows a post-processing setting from which intended printing results are obtained for each pagination setting. The post-processing setting is included in the printing setting. For example, when there is a pagination setting for a weekly magazine, "stapling: 2 center locations", "folding: folding into two", and "double-face/single-face; double face" may be set as a printing setting to produce a printed output which is stitched in a weekly magazine-type stitching. Therefore, when there is the pagination setting for the weekly magazine, changing the printing setting of the "stapling: 2 center locations", "folding: folding into two", and "double-face/single-face; double face" could lead to unintended printing results.

An example of the unintended printing results is such that, if a weekly magazine-type setting is provided, when the printing setting of the "stapling: 2 center locations" is changed to "stapling: upper-left", the page arrangement no longer makes sense, which could lead to unintended printing results.

Moreover, when there is a pagination setting for a mini-book, "folding: folding into two", "double-face/single-face; double face", and "stapling: no" may be set as a printing setting to produce a printed output which is stitched in a mini-book type stitching. Therefore, when the pagination setting for the mini-book is provided, changing the printing setting of the "folding: folding into two", "double-face/single-face; double face", and "stapling: no" could lead to unintended printing results.

Moreover, if a speed pagination setting (a setting for cutting into portions after printing, and overlapping the cut portions into one complete whole) is provided, setting of "double face/single face: double face or single face", "stapling; no", and "folding: no" as a printing setting makes it possible to produce a speed-stitched printed output. For the speed pagination setting, a page arrangement for pagination differs depending on a printing setting of "double face/single face". Therefore, when the speed pagination setting is provided, changing the printing setting of the "stapling: no", "folding: no", and "double-face/single-face; double face or single face" could lead to unintended printing results.

Changing the printing setting used in the explanations of FIG. 6 refers to a process such as changing a printing setting of "stapling" from "two center locations" to "upper left". The process of changing a printing setting of "stapling" from "two center locations" to "no" is to cancel (remove) the printing setting, so that it is to be distinguished from the above-described process of changing the printing setting.

As described above, in the PP business, it is necessary to allow canceling (removing) of the stapling process from the printing setting even when the pagination process for the weekly magazine is performed in the pre-processing, for example, taking into account the finisher process to be performed in the post-processing apparatus off-line.

Thus, in the process of checking whether there occurs a conflict between a printing setting changed at the print server 12 and a pagination setting which is set by the pagination process at the user client 1 in step S5 in FIG. 4, what changes a printing setting to one other than "no" is determined as a conflict.

Below, a method of determining a pagination setting to be performed in S5 is explained. In step S5, the pagination setting is determined by any one or a combination of below-described determining methods 1 to 3.

Figure 7:
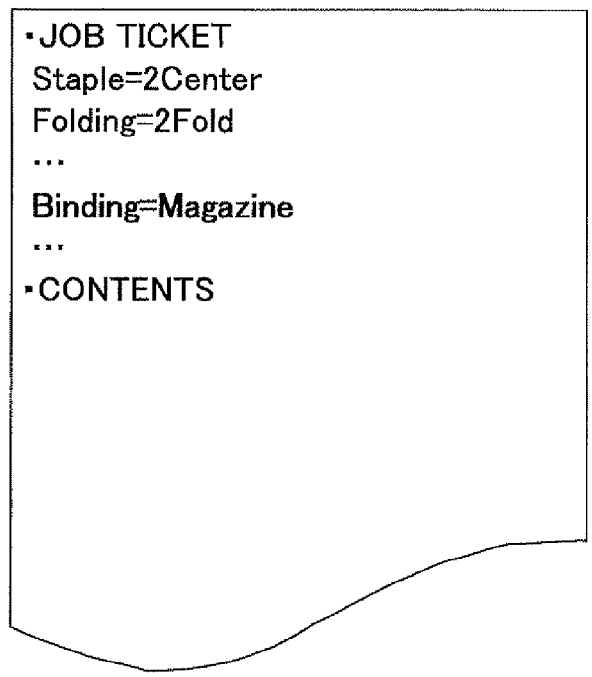
FIG. 7 is an image diagram of an exemplary job ticket into which a pagination attribute is inserted.

The determining method 1 for the pagination setting is to insert, into a job ticket, a pagination attribute which indicates a pagination setting (a weekly magazine, a mini-book, speed, etc.) at the user client 1 side. FIG. 7 is an image diagram of an exemplary job ticket into which the pagination attribute is inserted. Into the job ticket in FIG. 7 is inserted a pagination attribute for a weekly magazine "Binding=Magazine".

For example, the job ticket generating unit 32 of the user client 1 appends the pagination attribute to the job ticket. The pagination process determining unit 47 of the print server 12 may determine the pagination setting using the pagination attribute appended to the job ticket.

A determining method 2 of the pagination setting is to determine the pagination setting from a post-processing setting. In the determining method 2 of the pagination setting, a pagination setting is determined from a relationship of a post-processing setting from which intended printing results are obtained and the pagination setting shown in FIG. 6.

For example, the pagination process determining unit 47 determines the pagination setting from the post-processing setting of the job ticket saved by the job ticket saving unit 42. If the post-processing setting of "stapling: two center locations", "folding: folding into two", "double face/single face: double face" is set in the job ticket saved by the job ticket saving unit 42, the pagination process determining unit 47 may determine the pagination setting of the weekly magazine from a relationship of the post-processing setting from which intended printing results are obtained and the pagination setting shown in FIG. 6.

If the post-processing setting of "folding: folding into two", "double face/single face: double face", and "stapling: no" is set in the job ticket saved by the job ticket saving unit 42, the pagination process determining unit 47 may determine the pagination setting of the mini-book from a relationship of the post-processing setting from which intended printing results are obtained and the pagination setting shown in FIG. 6.

Moreover, a determining method 3 of the pagination setting is to estimate a position (for example, a position at a lower left portion or a upper left portion of the sheet) at which there is likely to be a page number from a direction of opening to analyze an image, to estimate a page number from the analyzed image, and to determine the pagination setting from a page arrangement.

Figure 8:
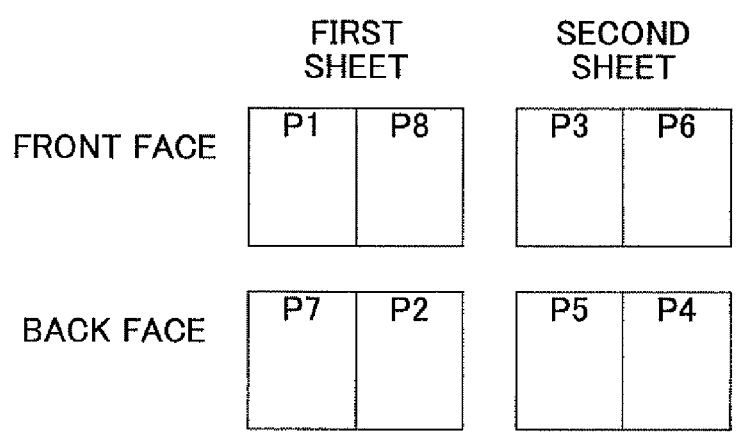
FIG. 8 is an image diagram of a page arrangement when a pagination setting for a weekly magazine is performed.

First, determining a pagination setting for a weekly magazine which uses the determining method 3 of the pagination setting is described. FIG. 8 is an image diagram of a page arrangement for performing pagination setting for the weekly magazine. As shown in FIG. 8, the page arrangement for performing the pagination setting for the weekly magazine is such that adding 1 to a smaller page number on the N-th face causes it to equal a smaller page number of the N+1-th face and that subtracting 1 from a larger page number on the Nth face causes it to equal a larger page number of the N+1-th face. Then, the pagination process determining unit 47 uses regularity of the page arrangement shown in FIG. 8 to determine whether it is the pagination setting for the weekly magazine.

Figure 9:
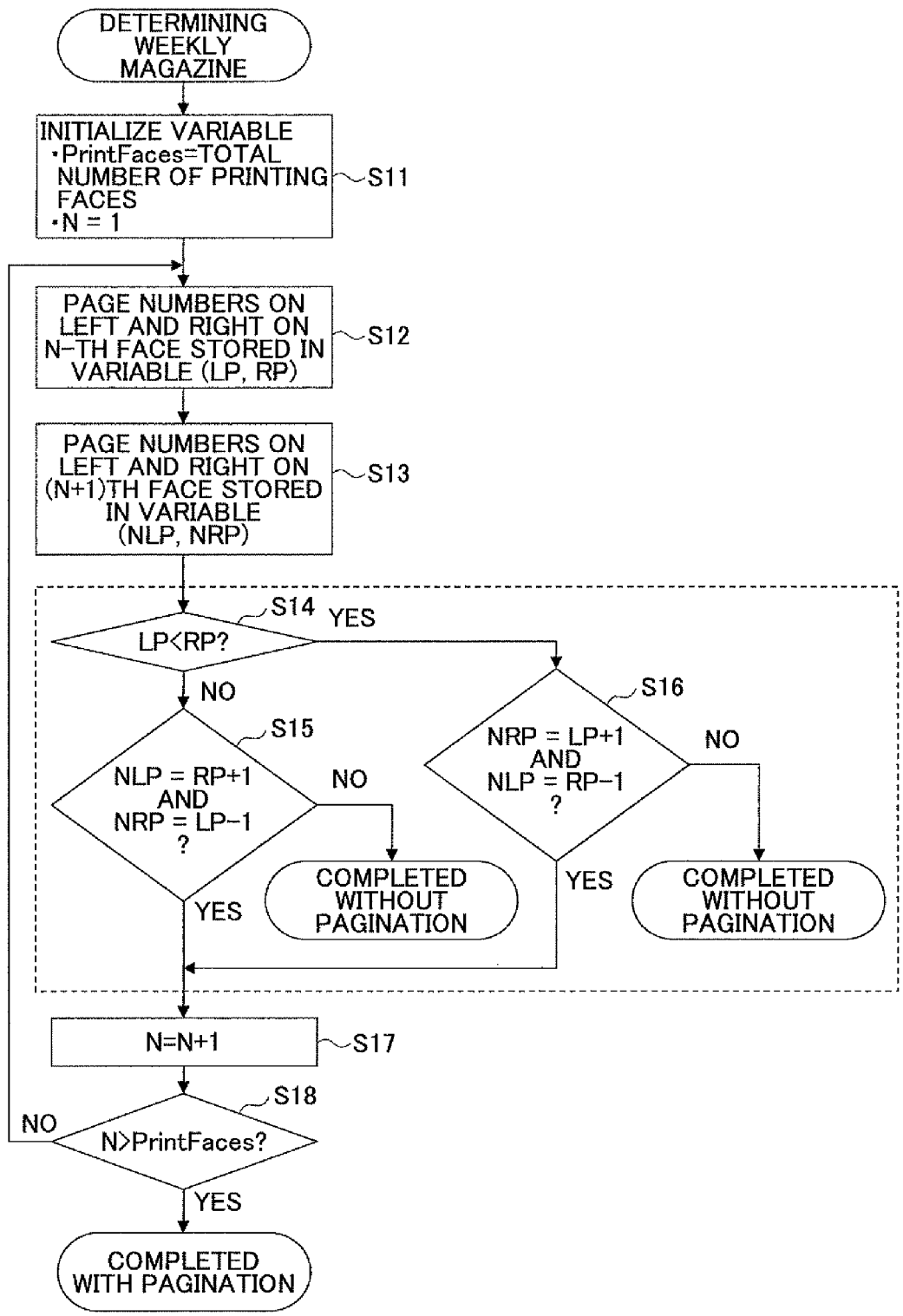
FIG. 9 is an image diagram of an exemplary process which determines whether the pagination setting for the weekly magazine is performed.

FIG. 9 is an image diagram of an exemplary process which determines whether it is the pagination setting for the weekly magazine.

In step S11, the pagination process determining unit 47 initializes a variable. The pagination process determining unit 47 sets a total number of printing faces of a paginated manuscript as a value of a variable PrintFaces. Moreover, a variable N is set to 1 as a counter. In step S12, the pagination process determining unit 47 records a page number on the left side on the N-th face into a variable LP and stores a page number on the right side on the N-th face into a variable RP. Moreover, in step S13, the pagination process determining unit 47 records a page number on the left side on the (N+1)th face in a variable NLP and a page number on the right side on the (N+1)th face into a variable NRP.

In step S14, the pagination process determining unit 47 determines whether LP<RP. If not LP<RP, the pagination process determining unit 47 determines whether NLP=RP+1 and NRP=LP−1 in step S15. If not (NLP=RP+1 and NRP=LP−1), the pagination process determining unit 47 determines that it is not the pagination setting for the weekly magazine, and ends the process shown in FIG. 9. If NLP=RP+1 and NRP=LP−1, the pagination process determining unit 47 adds 1 to the variable N in step S17.

In step S14, if LP<RP, the pagination process determining unit 47 determines whether NRP=LP+1 and NLP=RP−1 in step S16. If not (NRP=LP+1 and NLP=RP−1), the pagination process determining unit 47 determines that it is not the pagination setting for the weekly magazine, and ends the process shown in FIG. 9. If NRP=LP+1 and NLP=RP−1, the pagination process determining unit 47 adds 1 to the variable N in step S17.

Following step S17, in step S18, the pagination process determining unit 47 determines whether N>PrintFaces. If not N>PrintFaces, the pagination process determining unit 47 repeats the process of steps S12-S18. If N>PrintFaces, the pagination process determining unit 47 determines that it is the pagination setting for the weekly magazine, ending the process shown in FIG. 9.

In other words, the pagination process determining unit 47 may determine whether the pagination setting for the weekly magazine has been made by checking for all of the number of printing faces as to whether there is a match with the regularity of the page arrangement shown in FIG. 8.

Figure 10:
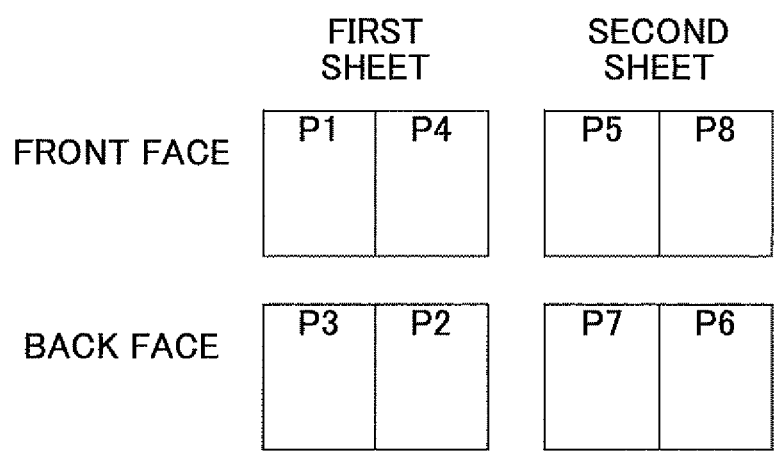
FIG. 10 is an image diagram of a page arrangement when a pagination setting for a mini-book is performed.

Next, determining a pagination setting for a mini-book which uses the determining method 3 of the pagination setting is described. FIG. 10 is an image diagram of a page arrangement when the pagination setting for the mini-book is made. As shown in FIG. 10, the page arrangement when the pagination setting for the mini-book is made is such that page numbers on the left and the right of a front face of the N-th sheet is a combination of (N−1)×4+1 and (N−1)×4+1+3, so that subtracting 1 from a larger page number on the front face of the N-th sheet causes it to become equal to a larger page number on a back face of the N-th sheet and adding 1 to a smaller page number on the front face of the N-th sheet causes it to become equal to a smaller page number on a back face of the N-th sheet. Then, the pagination process determining unit 47 uses the regularity of the page arrangement shown in FIG. 10 to determine whether it is the pagination setting for the mini-book.

Figure 11:
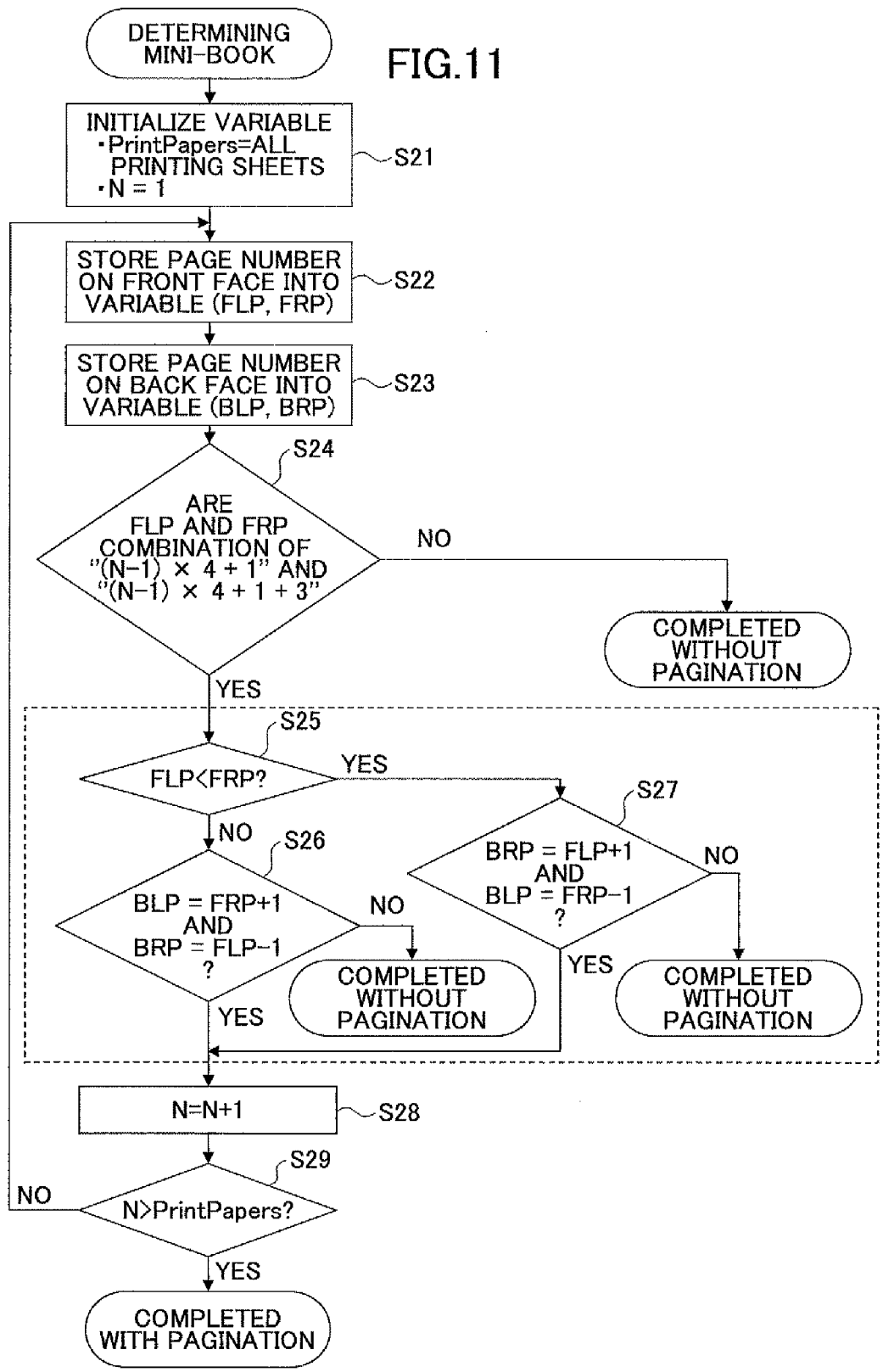
FIG. 11 is an image diagram of an exemplary process which determines whether it is the pagination setting for the mini-book.

FIG. 11 is an image diagram of an exemplary process which determines whether it is the pagination setting for the mini-book.

In step S21, the pagination process determining unit 47 initializes a variable. The pagination process determining unit 47 sets a total number of printing faces of a paginated manuscript to a value of a variable PrintPapers. Moreover, a variable N is set to 1 as a counter. In step S22, the pagination process determining unit 47 records a page number on the left side on the front face of the N-th sheet in a variable FLP and stores a page number on the right side on the front face of the N-th sheet into a variable FRP. In step S23, the pagination process determining unit 47 records a page number on the left side on the back face of the N-th sheet in a variable BLP and stores a page number on the right side on the back face of the N-th sheet into a variable BRP. In step S24, the pagination process determining unit 47 determines whether FLP and FRP are a combination of (N−1)×4+1 and (N−1)×4+1+3.

If FLP and FRP are not the combination of (N−1)×4+1 and (N−1)×4+1+3, the pagination process determining unit 47 determines that it is not a pagination setting for a mini-book, and the process shown in FIG. 11 is completed. If FLP and FRP are a combination of (N−1)×4+1 and (N−1)×4+1+3, the pagination process determining unit 47 determines whether FLP<FRP in step S25. If not FLP<FRP, the pagination process determining unit 47 determines whether BLP=FRP+1 and BRP=FLP−1 in step S26.

If not (BLP=FRP+1 and BRP=FLP−1), the pagination process determining unit 47 determines that it is not the pagination setting for the mini-book, and ends the process shown in FIG. 11. If BLP=FRP+1 and BRP=FLP−1, the pagination process determining unit 47 adds 1 to the variable N in step S28.

In step S25, if FLP<FRP, the pagination process determining unit 47 determines whether BRP=FLP+1 and BLP=FRP−1 in step S27. If not (BRP=FLP+1 and BLP=FRP−1), the pagination process determining unit 47 determines that it is not a pagination setting for the mini-book, and ends the process shown in FIG. 11. Moreover, if BRP=FLP+1 and BLP=FRP−1, the pagination process determining unit 47 adds 1 to the variable N in step S28.

Following step S28, in step S29, the pagination process determining unit 47 determines whether N>PrintPapers. If not N>PrintPapers, the pagination process determining unit 47 repeats the process of steps S22-S29. If N>PrintPapers, the pagination process determining unit 47 determines that it is a pagination setting for the mini-book, ending the process shown in FIG. 11.

In other words, the pagination process determining unit 47 may determine whether the pagination setting for the min-book is made by checking, for all of the printing sheets, whether there is a match with the regularity of the page arrangement shown in FIG. 10.

Figure 12:
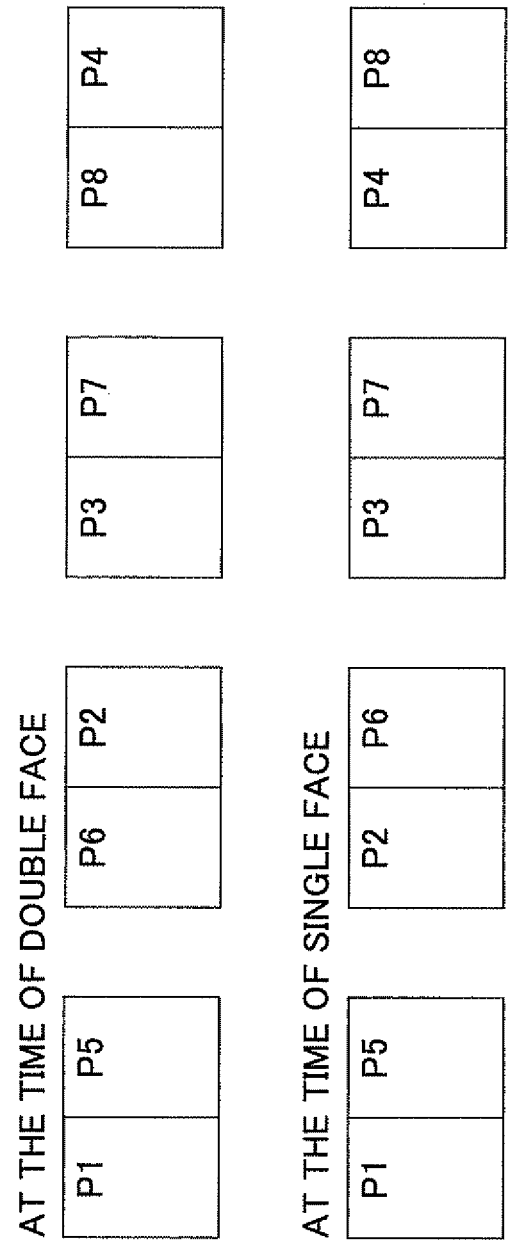
FIG. 12 is an image diagram of a page arrangement when a speed pagination setting is performed.

Moreover, determining a speed pagination setting using the determining method 3 of the pagination setting is described. FIG. 12 is an image diagram of a page arrangement in a case in which the speed pagination setting is provided. As shown in FIG. 12, the page arrangement in the case in which the speed pagination setting is provided differs between the time of double face printing and the time of single face printing. Moreover, a page arrangement in the case in which the speed pagination setting is provided is such that left and right page numbers for the nth face is a combination of N and N+PrintFaces. Then, the pagination process determining unit 47 uses the regularity of the page arrangement shown in FIG. 12 to determine whether it is the speed pagination setting.

Figure 13:
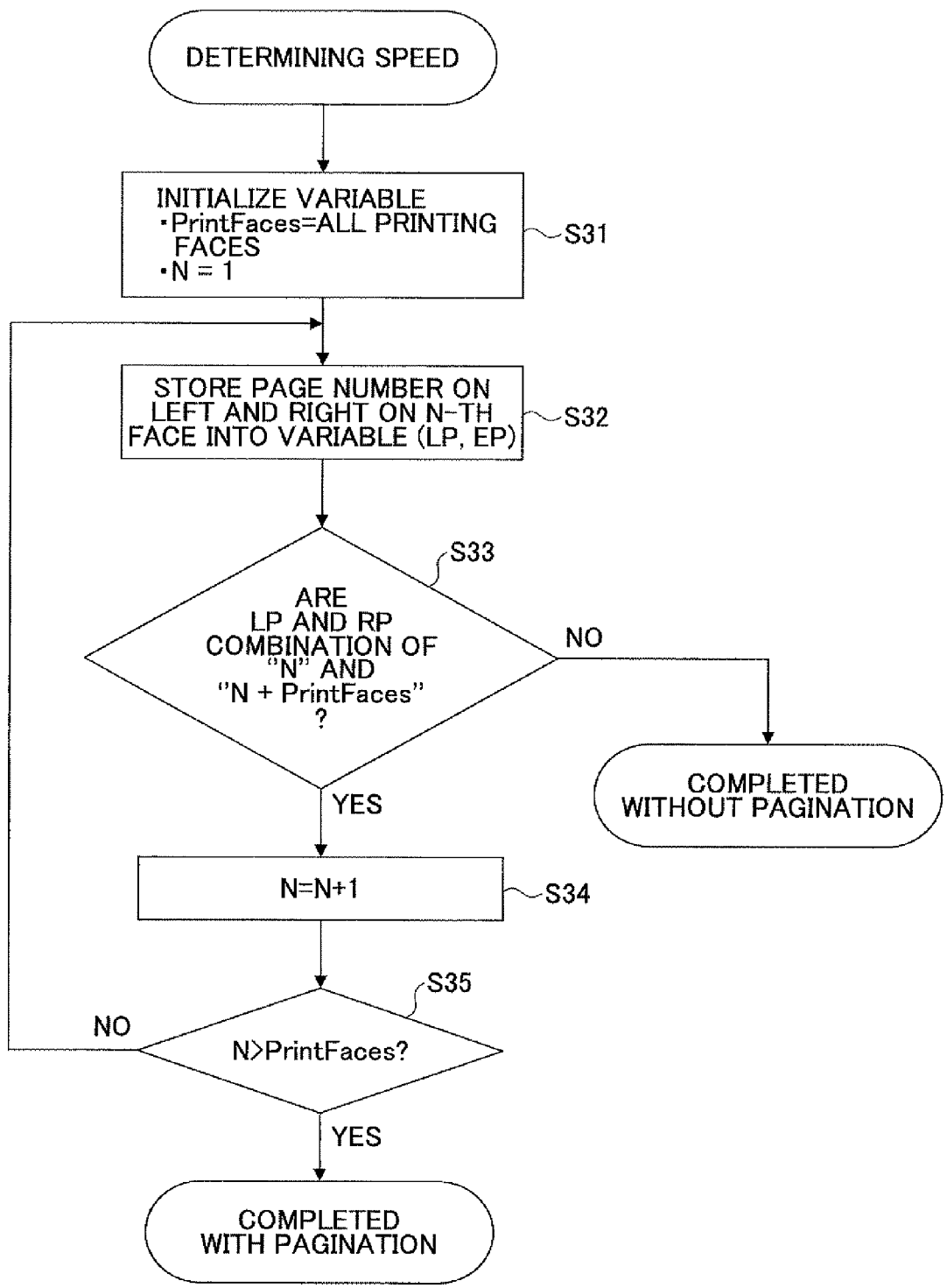
FIG. 13 is an image diagram of an exemplary process which determines whether it is the speed pagination setting.

FIG. 13 is an image diagram of an exemplary process which determines whether it is the speed pagination setting.

In step S31, the pagination process determining unit 47 initializes a variable. The pagination process determining unit 47 sets a total number of printing faces of a paginated manuscript as a value of a variable PrintFaces. Moreover, a variable N is set to 1 as a counter. In step S32, the pagination process determining unit 47 records a page number on the left side on the N-th face into a variable LP and stores a page number on the right side on the N-th face into a variable RP.

In step S33, the pagination process determining unit 47 determines whether LP and RP are a combination of N and N+PrintFaces. If the LP and the RP are not the combination of the N and the N+Print Faces, it is determined not the speed pagination setting, ending the process in FIG. 13.

If the LP and the RP are the combination of the N and the N+Print Faces, the pagination process determining unit 47 adds 1 to the variable N in step S34. Following step S34, in step S35, the pagination process determining unit 47 determines whether N>PrintFaces. If not N>PrintFaces, the pagination process determining unit 47 repeats the process of steps S32-S35. If N>PrintFaces, the pagination process determining unit 47 determines that it is the speed pagination setting, ending the process shown in FIG. 13.

In other words, the pagination process determining unit 47 may determine whether the speed pagination setting has been made by checking for all of the number of printing faces as to whether there is a match with the regularity of the page arrangement shown in FIG. 12.

For the above described determining methods 1 to 3 for pagination setting, use may be possible such that the determining method 1 is conducted first, the determining method 2 is conducted if it is not possible to determine the pagination setting with the determining method 1, and, moreover, the determining method 3 is conducted if it is not possible to distinguish the pagination setting with the determining method 2.

The present invention makes it possible to determine a pagination setting, and, if there is a change (except a release) from a post-processing setting from which is obtained intended printing results in the determined pagination setting, to provide a warning to a change on the post-process setting with a high likelihood of it having been performed erroneously. The release of the post-process setting is determined to be performed intentionally. Therefore, for the release of the post-process setting, the print server 12 does not display a warning screen.

The present invention is not limited to the specific embodiments disclosed, so that variations and changes are possible without departing from the claims.

The present application is based on Japanese Priority Application No. 2011-045639 filed on Mar. 2, 2011, the entire contents of which are hereby incorporated by reference.

The invention claimed is:

1. A non-transitory printing management program which causes a computer to function as
   a printing job accepting unit which accepts a printing job from a pre-process within a printing process;
   a printing setting change accepting unit which accepts, from a user, a change of a printing setting which is set for the accepted printing job;
   a determining unit which determines pagination setting associated with the printing job by,
      determining a position where page numbers are located on images of pages associated with the printing job,
      determining the page numbers on the pages by analyzing the images at the determined position, and
      determining the pagination setting associated with the printing job based on an order of the page numbers;
   a warning unit which provides a warning on the change of the printing setting depending on the pagination setting, the warning requesting the user to confirm whether the change of the print settings is intentional; and
   a printing execution unit configured to process the printing job by,
      passing the printing job to an image forming apparatus using the changed printing settings, if the user confirms that the change in print settings is intentional, and
      passing the printing job to the image forming apparatus using print settings associated with the pagination settings, if the user indicates that the change in print settings was unintentional.

2. The printing management program as claimed in claim 1, wherein
   the printing setting is a post-processing setting: and wherein
   the warning unit provides the warning on the change of the printing setting depending on the pagination setting which is set in the pre-process when the post-processing setting is not made in the accepted printing job, or even after the post-processing setting which is set in the accepted printing job is released.

3. The printing management program as claimed in claim 2, wherein the warning unit refers to a table in which is recorded, for each pagination setting of the printing job, collated therewith, from which post-processing setting intended printing results are obtained, and provides a warning on the change of the printing setting when there is the change other than a release of the printing setting that corresponds to the pagination setting of the printing job.

4. The printing management program as claimed in claim 2, wherein the pagination setting of the printing job is specified depending on a pagination attribute added to the printing job.

5. The printing management program as claimed in claim 1, wherein the warning unit provides the warning on the change of the printing setting depending on the pagination setting of the printing job.

6. A printing system, comprising:
   a printing management program as claimed in claim 1 that is executable by a computer; and
   an image forming apparatus.

7. A printing management apparatus, comprising:
   a printing job accepting unit which accepts a printing job from a pre-process within a printing process;
   a printing setting change accepting unit which accepts, from a user, a change of a printing setting which is set for the accepted printing job;
   a determining unit which determines pagination setting associated with the printing job by,
      determining a position where page numbers are located on images of pages associated with the printing job,
      determining the page numbers on the pages by analyzing the images at the determined position, and
      determining the pagination setting associated with the printing job based on an order of the page numbers;
   a warning unit which provides a warning on the change of the printing setting depending on the pagination setting, the warning requesting the user to confirm whether the change of the print settings is intentional; and
   a printing execution unit configured to process the printing job by,
      passing the printing job to an image forming apparatus using the changed printing settings, if the user confirms that the change in print settings is intentional, and
      passing the printing job to the image forming apparatus using print settings associated with the pagination settings, if the user indicates that the change in print settings was unintentional.

8. A printing system which includes a printing management apparatus and an image forming apparatus, wherein the printing management apparatus includes,
   a printing job accepting unit which accepts a printing job from a pre-process within a printing process;
   a printing setting change accepting unit which accepts, from a user, a change of a printing setting which is set for the accepted printing job;
   a determining unit which determines pagination setting associated with the printing job by,
      determining a position where page numbers are located on images of pages associated with the printing job,
      determining the page numbers on the pages by analyzing the images at the determined position, and
      determining the pagination setting associated with the printing job based on an order of the page numbers;
   a warning unit which provides a warning on the change of the printing setting depending on the pagination setting for the printing job, the warning requesting the user to confirm whether the change of the print settings is intentional; and
   a printing execution unit configured to process the printing job by, passing the printing job to the image forming apparatus using the changed printing settings, if the user confirms that the change in print settings is intentional, and passing the printing job to the image forming apparatus using print settings associated with the pagination settings, if the user indicates that the change in print settings was unintentional.

9. A print server comprising:

a receiver configured to receive,
- a printing job from a user device, and
- a modification command, the modification command instructing the print server to change one or more post-processing operations to be performed in the print job from one or more first post-processing operations to one or more second post-processing operations; and a processor configured to process the print job by,
- first determining pagination attributes associated with the first post-processing operations by,
  - determining a position where page numbers are located on images of pages associated with the printing job,
  - determining the page numbers on the pages by analyzing the images at the determined position, and
  - determining the pagination attributes associated with the first post-processing operations based on an order of the page numbers;
- second determining whether the second post-processing operations conflict with the pagination attributes associated with the first post-processing operations,
- third determining if the conflict is intentional by instructing the user device to receive feedback from a user, if the second determining determines that the conflict exists, and
- continuing processing the printing job using the second post-processing operations, if the feedback from the user indicates that the conflict is intentional.

10. The print server of claim 9, wherein the processor is configured to determine whether the second post-processing operations conflict with the pagination attributes by,
- determining, via a database, standard post-processing operations associated with the pagination attribute, and
- comparing the standard post-processing operations with the second post-processing operations.

* * * * *